United States Patent [19]

Humphreys

[11] Patent Number: 4,465,103

[45] Date of Patent: Aug. 14, 1984

[54] SELF-REGULATING FLOW CONTROL DEVICE

[75] Inventor: Duane A. Humphreys, Pittsburgh, Pa.

[73] Assignee: The United States of America as represented by the United States Department of Energy, Washington, D.C.

[21] Appl. No.: 399,950

[22] Filed: Jul. 20, 1982

[51] Int. Cl.³ .............................................. F15D 1/10
[52] U.S. Cl. ..................................................... 138/40
[58] Field of Search ...................... 138/46, 43, 40, 31; 137/504, 8; 239/453, 533.1, 570, 571

[56] References Cited

U.S. PATENT DOCUMENTS

| | | | |
|---|---|---|---|
| 1,063,933 | 6/1913 | Keller | 138/46 |
| 1,211,583 | 1/1917 | Homeier | 138/40 |
| 2,555,803 | 6/1951 | Mashinter et al. | 239/453 |
| 2,588,555 | 3/1952 | Molloy | 138/43 X |
| 4,080,993 | 3/1978 | Lind, Jr. | 137/504 |
| 4,112,959 | 9/1978 | Jaekel | 137/504 |

FOREIGN PATENT DOCUMENTS 18522 of 1889 United Kingdom ................ 137/504

OTHER PUBLICATIONS

Idel'chik, I. E. *Handbook of Hydraulic Resistance: Coefficients of Local Resistance and of Friction.*

Primary Examiner—Stephen Marcus
Assistant Examiner—Mark Thronson
Attorney, Agent, or Firm—Judson R. Hightower; Michael F. Esposito

[57] ABSTRACT

A variable, self-regulating valve having a hydraulic loss coefficient proportional to a positive exponential power of the flow rate. The device includes two objects in a flow channel and structure which assures that the distance between the two objects is an increasing function of the flow rate. The range of spacing between the objects is such that the hydraulic resistance of the valve is an increasing function of the distance between the two objects so that the desired hydraulic loss coefficient as a function of flow rate is obtained without variation in the flow area.

3 Claims, 11 Drawing Figures

SELF-REGULATING FLOW CONTROL DEVICE

The U.S. Government has rights in this invention pursuant to Government Contract Number DE-AC11-76PN00014 between the United States Department of Energy and Westinghouse Electric Corporation.

FIELD OF THE INVENTION

The present invention relates to a variable self-regulating valve and more particularly to a variable self-regulating flow control device having a hydraulic loss coefficient proportional to a positive exponential power of the flow rate.

BACKGROUND OF THE INVENTION

Flow control valves used to hydraulically damp stochastic or periodic flow rate perturbations are used in such diverse devices as showerheads, nozzles and heating and cooling systems. In such devices it is desirable that the valves have a hydraulic loss coefficient proportional to a positive exponential power of the flow rate. Such valves are disclosed in U.S. Pat. Nos. 1,021,677; 1,211,583; 2,179,292; 2,555,803; 2,845,087; 3,659,433; 4,080,993; 4,082,225; and 4,244,526. In each of these valves the fundamental principle of operation is the control of flow rate by control of the flow area. In the valves disclosed in U.S. Pat. Nos. 2,179,292 and 4,082,225 a moveable object and an orifice or orifices are combined in the form of a spring loaded, slotted piston whose position relative to an enclosing stepped bore determines that position of the slots which is open for fluid flow. In the valves disclosed in the remaining cited patents, a moveable object is used with or without a tensioning spring to partially block a separate fixed oriface or orifaces. All of these valves have a common problem. Failure of the valve can result in a complete flow blockage by a broken component.

It has been observed that the hydraulic loss coefficient for flow of nonviscous fluid past two objects in a uniform channel having a Reynolds number greater than $1 \times 10^5$ is an increasing function of the distance between the objects. See *Handbook of Hydraulic Resistance: Coefficients of Local Resistance and of Friction*, by I. E. Idel'chik. The hydraulic resistance of such an arrangement is directly proportional to the hydraulic loss coefficient. For example, for two identical cylindrical objects in a cylindrical channel as schematically illustrated in FIGS. 1(a) and 1(b), the hydraulic resistance $R_D$ is given by the following formula:

$$R_D = \frac{1.15C\,(4d/\pi D)}{(1 - 4d/\pi D)^3}$$

where C is the hydraulic loss coefficient, d is the diameter of the cylindrical objects and D is the diameter of the channel. Similarly, for two identical disc-shaped or spherically-shaped objects in a cylindrical channel as schematically illustrated in FIGS. 2(a) and 2(b), the hydraulic resistance $R_D$ is given by the following formula:

$$R_D = \frac{1.30C\,(d/D)^2}{\{1 - 3/2(d/D)^2\}^3}$$

As is shown in the graphs presented in FIGS. 1(c) and 2(c), which are based on experimental results published in Idel'chik, the hydraulic loss coefficient C for each of the two illustrative examples, as a function of ratios of the distance between the two objects to the diameter of the objects, is monotonicly increasing in the operating range indicated for a Reynolds number greater than $1 \times 10^5$.

Two objects in a channel as illustrated may be used in a valve arrangement having a hydraulic loss coefficient which varies as a positive exponential power of the flow rate. Such a valve may be used to damp flow rate perturbations, including periodic variations. Since the diameter of the objects is characteristically less than that of the channel, there is no danger of a blockage to flow should one or both of the objects be damaged.

OBJECTS OF THE INVENTION

Accordingly, it is an object of the present invention to provide a variable, self-regulating flow control device capable of hydraulically damping stochastic and periodic flow rate perturbations, without risk of blocking the device in the event of its failure.

It is also an object of the present invention to provide a variable, self-regulating flow control device, capable of hydraulically damping stochastic and periodic flow rate perturbations, having a hydraulic loss coefficient proportional to a positive exponential power of the flow rate.

Another object of the present invention is to provide a variable, self-regulating flow control device, capable of hydraulically damping stochastic and periodic flow rate perturbations using two objects, one fixed and one movable to create an irrecoverable pressure drop.

A further object of the present invention is to provide a variable, self-regulating flow control device having a flow channel of constant flow area, using two objects, one fixed and one moveable, in the channel, such that the hydraulic resistance of the device is proportional to the distance between the two objects.

Still another object of the invention is to provide a variable, self-regulating flow control device of constant flow area, having a hydraulic loss coefficient proportional to a positive exponential power of the flow rate.

SUMMARY OF THE INVENTION

The present invention fulfills the above listed objectives by providing a flow control device having a uniform channel for conducting fluid past first and second spaced-apart objects located along the axis of the channel. The two objects create a drag force on the fluid, the force having a magnitude which is an increasing function of the axial distance between the objects. The flow area past the objects, however, is a constant, independent of the distance between the objects. Movement of the second object relative to the first is resisted by a resistance element, such as a spring, with a force which increases with increasing relative displacement of the second object, whereby the hydraulic resistance to fluid flow past the two objects is an increasing function of the flow rate. In the preferred embodiment of the invention, the objects are spheres and their relative movement is damped by a damping cylinder. Alternative useful shapes for the objects include cylinders, discs and ellipsoids.

BRIEF DESCRIPTION OF THE DRAWINGS

These and other aspects of the invention are more thoroughly described in the following detailed description of the preferred embodiment with reference to the accompanying drawings in which.

PREFERRED EMBODIMENTS

Figures 1A, 1B:
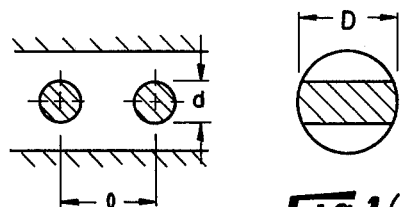
FIGS. 1(a) and 1(b) are respectively side and end views of a first arrangement used to schematically illustrate a basic principle of the present invention.
Figure 1C:
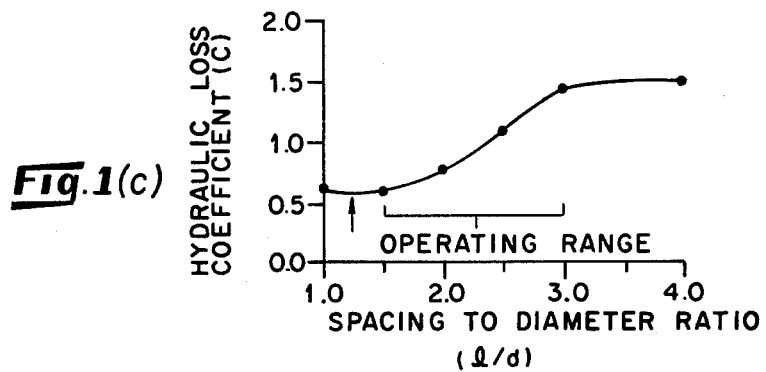
FIG. 1(c) is a graphical representation of the hydraulic loss coefficient observed in the arrangement shown in FIGS. 1(a) and 1(b)
Figures 2A, 2B:
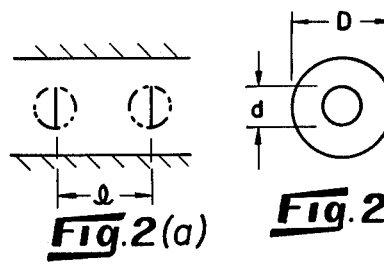
FIGS. 2(a) and 2(b) are respectively side and end views of a second arrangement used to schematically illustrate the principle of the present invention.
Figure 2C:
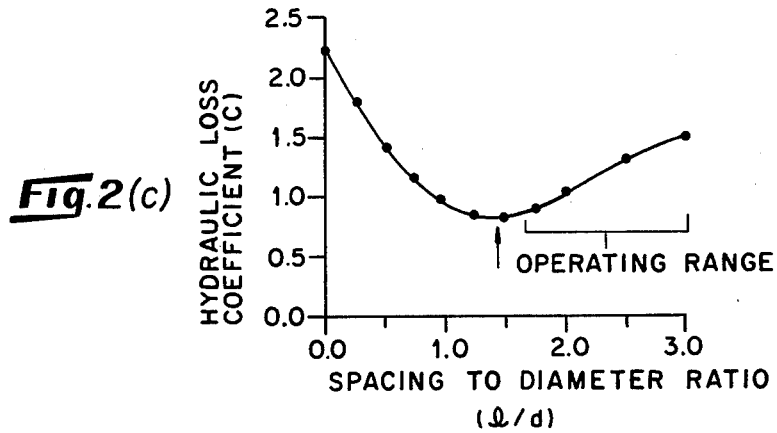
FIG. 2(c) is a graphical representation of the hydraulic loss coefficient observed in the arrangement shown in FIGS. 2(a) and 2(b)
Figure 3:
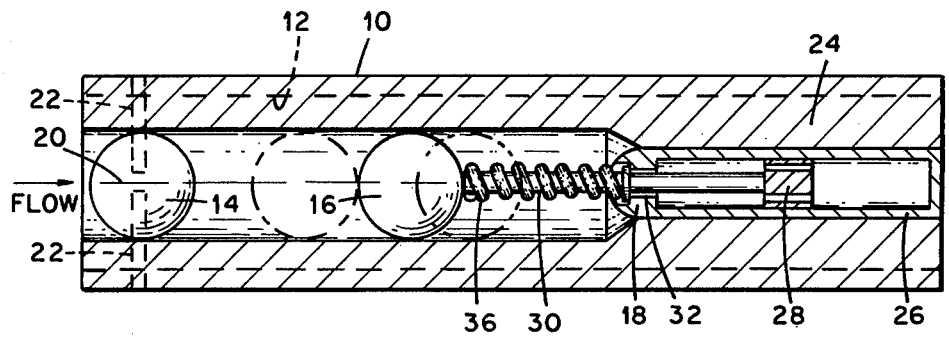
FIG. 3 is a longitudinal sectional view of a first embodiment of the valve of the present invention taken along Section 3—3 of FIG. 4.
Figure 4:
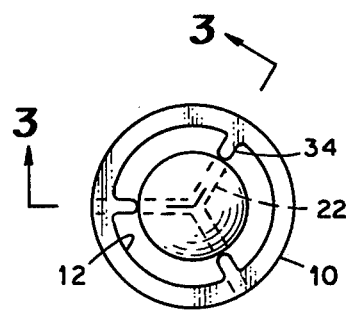
FIG. 4 is an upstream view of the embodiment shown in FIG. 3.

FIG. 3 illustrates one embodiment of a variable, self-regulating valve according to the invention, including a cylindrical valve member 10 defining a uniform cylindrical channel 12, a fixed spherical object 14, a moveable spherical object 16 and structure 18 for controlling the motion of object 16 relative to object 14 in response to fluid flow in channel 12. Referring to FIG. 4, fixed object 14 is centered on the longitudinal axis of symmetry 20 of the channel 12 by support pins 22 extending radially inward from cylinder 10. Referring back to FIG. 3, downstream of fixed object 14 the structure 18 is fixed along axis 20 by radially inward extending vanes 24. Structure 18 includes damping cylinder 26 and a control leakage piston 28 which is axially moveable in cylinder 26. A shaft 30 connects control leakage piston 28 to moveable object 16 through opening 32 at the upstream end of damping cylinder 26. Guide vanes 34 center moveable object 16 within channel 12, thereby limiting motion of object 16 to the central axis 20 of channel 12. A spring 36 wound about the upstream end of shaft 30 between moveable object 16 and the upstream end of damping cylinder 26, is sized so that at the low end of the operational range (shown in the graph in FIG. 2(c)), the return spring overcomes the drag force on the moveable object 16 and the fixed object to moveable object spacing is a minimum.

As can be seen in FIG. 2(c), the minimum centerline to center-line spacing between object 14 and object 16 should be approximately 1.5 object diameters. Smaller spacings should be avoided because, as is illustrated in FIG. 2(c), a minimum exists in the loss coefficient (C) versus spacing to diameter ratio (l/d) curve. The minimum in the curve represents a point of unstable equilibrium from which the moveable object 16 could deflect in either axial direction.

Moveable object 16 and return spring 36 are also sized so that at the maximum anticipated flow rate in the flow control, the drag on the moveable object 16 will compress the return spring 36 so that the centerline to centerline spacing between the fixed and moveable objects lies in the range of between approximately 2.3 and 3.0 object diameters. This spacing takes advantage of the full operating range indicated in FIG. 2(c) where the hydraulic loss coefficient increases substantially linearly with increasing spacing-to-diameter ratio.

The operation of this embodiment is as follows. If the flow rate through the valve increases from a steady value, the drag on the moveable object 16 will increase and the moveable object 16 will compress the return spring 36 to increase the centerline to centerline spacing. This movement will increase both the pressure drop and the hydraulic loss coefficient (C). The damping cylinder 26 provides sufficient resistance to motion of the moveable object 16 to result in a stable hydraulic system so that the moveable object 16 will reach a new equilibrium position unless it is further perturbed. Since the hydraulic loss coefficient has increased as a result of movement of the moveable object 16, the final flow rate through the valve is less than the final flow rate through a fixed orifice. If the flow rate through the valve decreases from a steady value, the drag on the moveable object 16 will decrease and the moveable object 16 will expand the return spring to decrease the centerline to centerline spacing. This movement will decrease both the pressure drop and the hydraulic loss coefficient. The moveable object 16 will then reach a new equilibrium position. Since the hydraulic loss coefficient has decreased as a result of movement of the moveable object 16, the final flow rate through the valve is greater than the final flow rate through a fixed orifice. Thus, the valve of the present invention substantially damps perturbations, including period variations, in flow rate.

Figure 5:
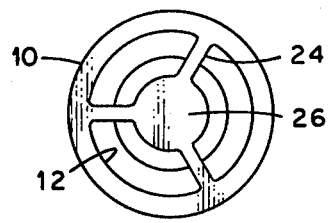
FIG. 5 is a downstream view of the embodiment shown in FIG. 3.
Figure 6:
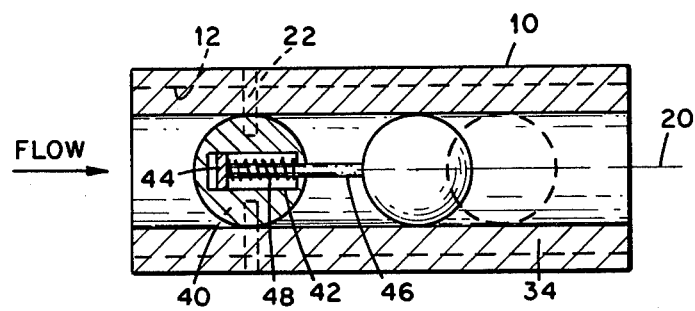
FIG. 6 is a longitudinal sectional view of a second embodiment of the valve of the present invention taken along Section 6—6 of FIG. 7.
Figure 7:
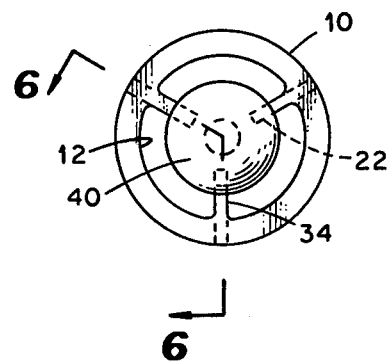
FIG. 7 is an upstream view of the embodiment shown in FIG. 6.

A second embodiment of the present invention is illustrated in FIGS. 6 and 7. Referring to FIG. 6, in which numerals identical to those in FIGS. 3-5 represents substantially identical elements, a spherical object 40 is fixed at the upstream end of channel 12 in cylindrical valve member 10 by support pins 22. Interior of fixed object 40 and aligned with the central longitudinal axis of channel 12, is a damping cylinder 42 provided with a control leakage piston 44. A connecting shaft 46 connects leakage piston 44 to moveable object 16 downstream from fixed object 40. Moveable object 16 is aligned on axis 20 by guide vanes 34. A return expansion spring 48 is wrapped around the upstream end of shaft 46 between controlled leakage piston 44 and the downstream end of damping cylinder 42. The moveable object 16 and return spring 48 are sized in a manner similar to object 16 and spring 36 of the embodiment shown in FIG. 3, that is, so that at the low end of the operational flow range the return spring overcomes the drag force on the movable object and the fixed object to moveable object spacing is a minimum, that minimum being about 1.5 object diameters.

The operation of the second embodiment is substantially identical to that of the first embodiment except that under similar flow conditions return spring 48 would expand where return spring 36 would contract and vice versa.

This invention has been described by way of illustration rather than limitation, and it is intended to cover the appended claims and all variations and modifications as fall within the true spirit and scope of the invention. For example, the principles of operation of the invention are valid for many objects geometries. Potentially useful geometries include but are not limited to spheres, cylinders, discs and elipsoids. A combination of two different object shapes and/or sizes may also be used.

What is claimed is:

1. A variable, self-regulating flow control device for controlling flow rate consisting essentially of:
   a. first means, defining a channel having a longitudinal axis, a minimum cross sectional area perpendicular to said axis, and at least one opening at either end for conducting a fluid therethrough along said axis in a first direction;
   b. a stationary object having a maximum cross sectional area perpendicular said axis which is less than said minimum cross sectional area and disposed in said channel on said axis and substantially fixed with respect to said first means;
   c. a moveable object having a maximum cross sectional area perpendicular said axis which is less than said minimum cross sectional area and disposed in said channel on said axis said moveable object being spaced from said stationary object and moveable in a direction parallel to said axis and responsive to drag forces exerted by said fluid to be displaced in said first direction; and
   d. means for resisting displacement of said moveable object in said first direction with a force which increases with increasing displacement of said moveable object in said first direction;
   whereby hydraulic resistance to fluid flow past said stationary and moveable objects is an increasing function of the instantaneous distance between said stationary and moveable objects and whereby the difference between said minimum cross sectional area and one of said maximum cross sectional areas constitutes a flow area, said device being operable to control said flow rate while maintaining said flow area substantially constant.

2. The flow control device of claim 1 wherein said channel has a substantially constant circular cross section, and said maximum cross sectional areas of said stationary object and said moveable object are substantially identical circular areas.

3. The flow control device of claim 1 wherein said displacement resisting means comprises a spring positioned between said stationary object and moveable object.

* * * * *